(12) United States Patent
Smetana

(10) Patent No.: US 8,348,039 B2
(45) Date of Patent: Jan. 8, 2013

(54) CLAMPING ROLLER FREEWHEEL

(75) Inventor: Tomas Smetana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 622 days.

(21) Appl. No.: 12/541,479

(22) Filed: Aug. 14, 2009

(65) Prior Publication Data

US 2010/0040318 A1  Feb. 18, 2010

(30) Foreign Application Priority Data

Aug. 16, 2008 (DE) .......................... 10 2008 037 995

(51) Int. Cl.
*F16D 41/067* (2006.01)

(52) U.S. Cl. .............................. 192/45.008; 192/107 T

(58) Field of Classification Search ............... 192/107 T, 192/45, 44, 45.001–45.02; 188/82.84
See application file for complete search history.

(56) References Cited

U.S. PATENT DOCUMENTS

| 838,024 | A | * | 12/1906 | Hendricks | 188/82.3 |
| 842,841 | A | * | 1/1907 | Starr | 192/45 |
| 1,338,556 | A | * | 4/1920 | Garren | 188/130 |
| 2,398,261 | A | * | 4/1946 | Stone | 192/45 |
| 6,705,444 | B2 | * | 3/2004 | Fujiwara et al. | 192/45 |

FOREIGN PATENT DOCUMENTS

DE 1706448 U 9/1955

* cited by examiner

*Primary Examiner* — Rodney Bonck
*Assistant Examiner* — Lillian Nguyen
(74) *Attorney, Agent, or Firm* — Lucas & Mercanti, LLP; Klaus P. Stoffel

(57) ABSTRACT

A clamping roller freewheel, which has an inner ring, an outer ring and clamping rollers arranged between the inner ring and outer ring. The clamping rollers interact, in each case, with one clamping ramp formed on the outer circumference of the inner ring. The clamping rollers are surrounded by an elastically expandable protective ring which is concentric with respect to the freewheel axis. Retaining lugs prevent the protective ring from being driven in rotation by the outer ring in idle running operation. In this way, the outer ring is prevented from grinding against the clamping rollers, and the clamping rollers are prevented from being driven in rotation, with the resulting wear to the clamping ramps, in idle running operation.

8 Claims, 2 Drawing Sheets

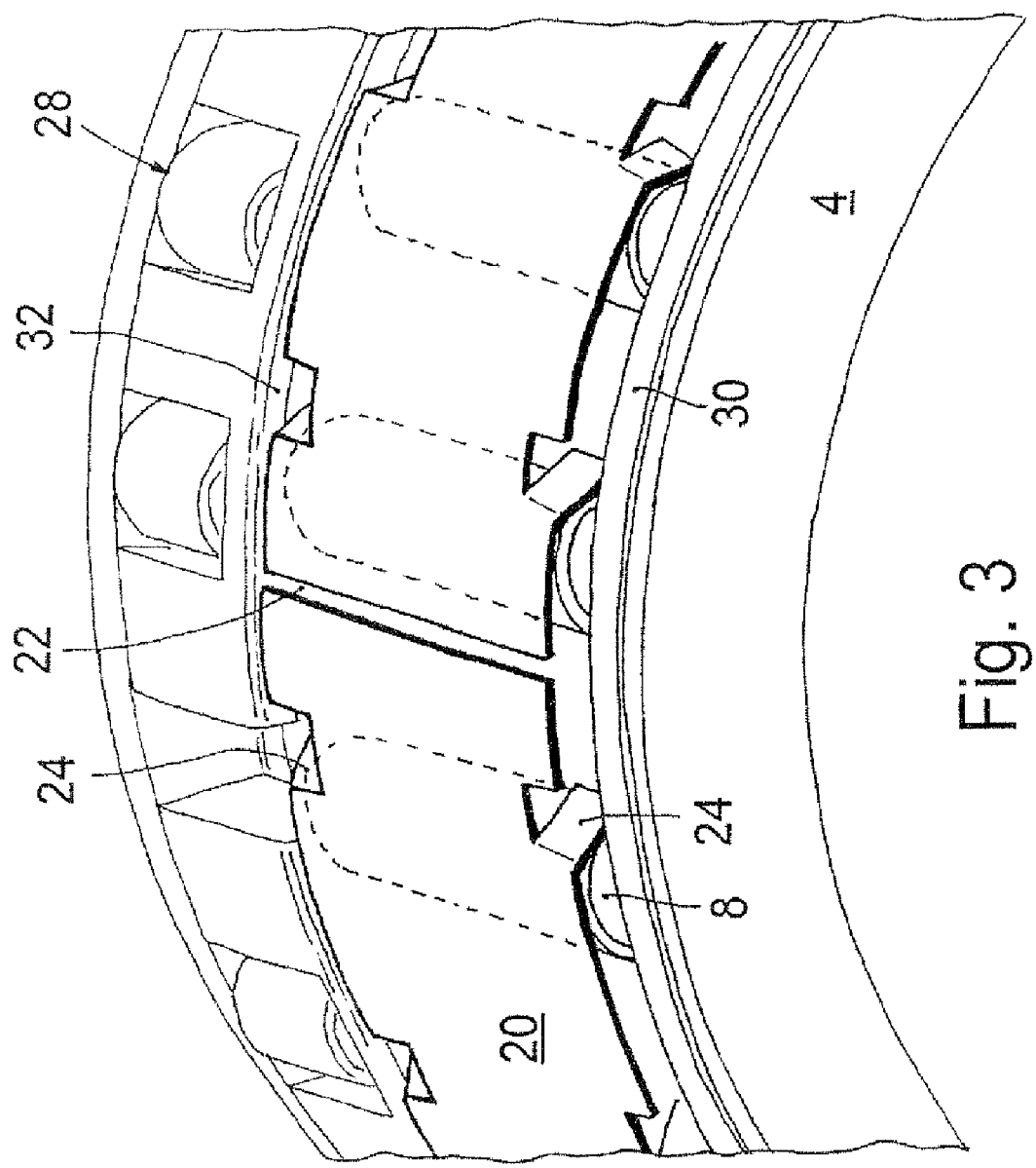

CLAMPING ROLLER FREEWHEEL

FIELD OF THE INVENTION

The invention relates to a clamping roller freewheel having an inner ring and having an outer ring and also having clamping rollers arranged between said inner ring and outer ring, which clamping rollers interact with in each case one clamping ramp formed on the outer circumference of the inner ring.

BACKGROUND OF THE INVENTION

Clamping roller freewheels are a special type of the range of freewheel devices referred to generally as clamping body freewheels. Said clamping roller freewheels are used for example as overrunning clutches which, for example, decouple an originally driven branch of a drivetrain when said branch overruns the driving part of the drivetrain. Freewheel devices of said type are also used as non-return devices. The functional principle of all clamping body freewheels is that, in one drive direction, the clamping bodies become wedged and thereby produce a force-fitting connection between the inner ring and outer ring, while in the other drive direction the wedging action is eliminated and the inner ring is thereby decoupled from the outer ring.

A distinction is made fundamentally between clamping roller freewheels with clamping ramps formed on the inner ring (inner star) or clamping ramps formed on the outer ring, with the drive generally being introduced via the ring which has the clamping ramps. The former clamping roller freewheels have the advantage over the latter type that the centrifugal forces acting on the clamping rollers assist the clamping action, that is to say the abutment against the outer ring, while in the latter type the centrifugal force counteracts the clamping action. For this reason, clamping roller freewheels, which are used as overrunning clutches, are usually formed with an inner start. At relatively high rotational speeds of the inner ring in idle running operation, the clamping rollers are pressed against the outer ring by centrifugal forces, such that friction forces are generated between the clamping rollers and the outer ring.

One difficult aspect in structural terms is that of optimally designing the clamping springs which preload the clamping rollers in the direction of their clamping position and which likewise press the clamping rollers against the outer ring. If the clamping springs are too strong, then, in overrunning operation, the outer ring grinds against the clamping rollers, which leads to wear of the clamping rollers. In contrast, if the clamping springs are too soft, the clamping rollers are driven by the outer ring in overrunning operation. The wear is thereby relocated to the clamping ramps on the inner ring or to the clamping springs. So-called idle running wear generates an increase in the clamping ramp angle and, therefore, a reduction in the slip resistance of the freewheel. A rotational movement of the clamping rollers in overrunning operation can also have the result of changing the position of individual clamping rollers on the associated ramps, such that these are overloaded when the freewheel switches to driving operation. This may result in plastic deformation of the ramps and even in the clamping rollers overrunning the ramps.

DE 1 706 448 U1 has already disclosed a clamping roller freewheel of the type specified in the introduction, in which, in the freewheeling or overrunning position, the clamping rollers are pulled against the wedge surface star by means of a resilient tension element, which is wrapped around all of the clamping rollers, such that said clamping rollers do not make contact with the outer ring (referred to as the clamping ring), that is to say said clamping rollers are lifted up from said outer ring entirely. In this way, no tangential force is transmitted from the outer ring to the clamping rollers in this operating state, such that a switch to driving operation does not take place immediately upon the synchronization of the speeds of the inner ring and outer ring, but rather only when a predefined rotational speed of the inner ring is reached at which the clamping rollers are adjusted by centrifugal force into an initial clamping position, which then leads to wedging of the clamping rollers.

OBJECT OF THE INVENTION

The object on which the invention is based is that of improving a clamping roller freewheel in such a way that idle running wear is prevented or at least reduced and therefore the service life of the clamping roller freewheel is increased, and that shock loadings are avoided during a switch into driving operation, with it being sought, however, for a switch to drive operation to not be dependent on the attainment of a certain drive rotational speed.

SUMMARY OF THE INVENTION

The invention is based on the realization that the technical problems specified further above are caused by the direct contact between the outer ring and the clamping rollers, which causes wear to the clamping roller when the clamping rollers are not rotating and wear to the clamping ramps and/or to the clamping springs when the clamping rollers are rotating.

The invention is therefore based, on a clamping roller freewheel having an inner ring and having an outer ring and also having clamping rollers arranged between said inner ring and outer ring, which clamping rollers interact with in each case one clamping ramp formed on the outer circumference of the inner ring. Here, it is provided according to the invention, that the clamping rollers are surrounded by an elastically expandable protective ring which is concentric with respect to the freewheel axis, and means are provided, which cause the protective ring to be driven in rotation, at least in the idle running rotational direction of the inner ring.

The protective ring, which surrounds the clamping rollers, advantageously prevents direct contact between the clamping rollers and the outer ring. During driving operation, the clamping rollers are wedged between the clamping ramps of the driving inner ring and the elastically expandable protective ring, press the latter against the inner circumference of the outer ring, and drive the outer ring via a frictionally engaging connection.

In idle running operation, the wedging action of the clamping rollers between the clamping ramps and the protective ring is eliminated; said protective ring is, however, driven in the idle running rotational direction of the inner ring by the means for rotational driving, with said inner ring performing a sliding movement with respect to the outer ring. In this way, the outer ring can neither grind against nor rotate the clamping rollers. In this way, wear to the clamping rollers or to the clamping ramps is prevented. Furthermore, individual clamping rollers are prevented from being adjusted into different positions as a result of being driven by the outer ring, such that shock loadings during the switch into driving operation are also avoided.

According to one refinement of the invention, the protective ring is formed as a slotted ring which permits an elastic expansion and, therefore, frictionally engaging contact against the outer ring.

According to one preferred refinement of the invention, the means for driving the protective ring in rotation are formed in each case by retaining lugs which are formed on said protective ring and which bear against the clamping rollers.

One particularly expedient design embodiment of the protective ring provides that said protective ring is formed from an elastic material strip which is pre-shaped so as to bear, for example, with a slight preload against the inner circumference of the outer ring.

The protective ring preferably has a width which corresponds substantially to the axial length of the clamping rollers, such that the protective ring completely covers said clamping rollers and transmits the clamping force of the clamping rollers over the entire roller length.

In one preferred design embodiment of the invention, retaining lugs, which are cut out of the material strip surface, are bent radially inward at least at one side edge, but preferably at both side edges of the protective ring, in such a way, that said retaining lugs bear against the clamping rollers in the idle running rotational direction of the inner ring, such that the protective ring cannot rotate relative to the inner ring, as has already been explained above.

As a material for the protective ring, use is preferably made of a spring steel material which is rolled with a greater diameter than the bore of the outer ring, in such a way that the protective ring bears with a slight preload against the inner circumference of the outer ring.

The above-described retaining lugs are preferably guided axially on cage rims of the clamping roller freewheel, such that the protective ring is fixed axially.

As is known per se, the inner ring may at the same time have a raceway for a rolling bearing which is coaxial to the clamping roller freewheel, such that the clamping roller freewheel is optimally centered.

BRIEF DESCRIPTION OF THE DRAWINGS

The invention is explained in more detail below on the basis of the appended drawing of an exemplary embodiment, in which drawing:

FIG. 3 shows a perspective partial plan view of a clamping roller freewheel with protective ring.

DETAILED DESCRIPTION OF THE DRAWINGS

Figure 1:
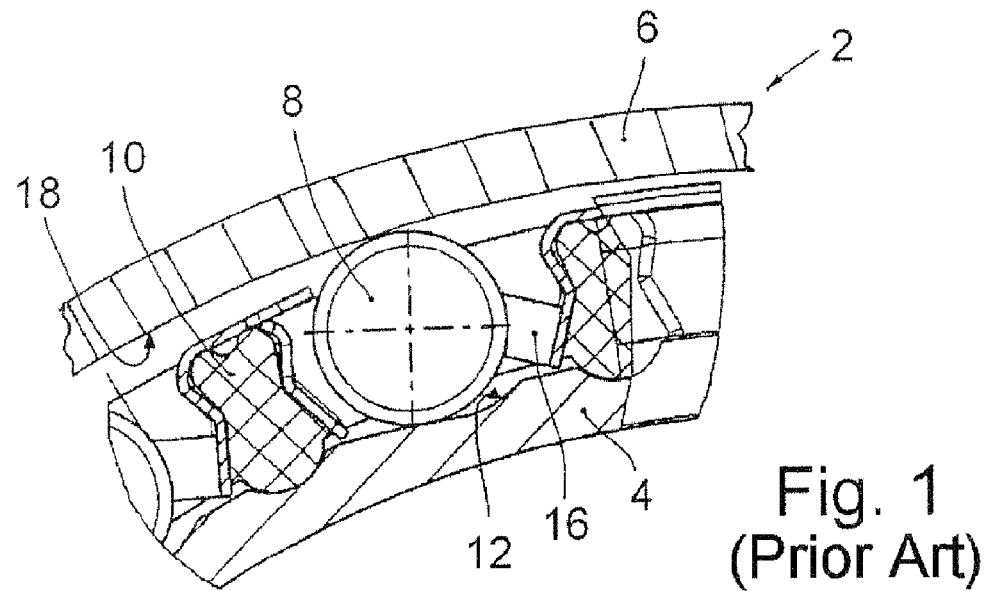
FIG. 1 shows a partial cross section through a conventional clamping roller freewheel with clamping ramps formed on the inner ring.

The segment of a conventional clamping roller freewheel 2 illustrated in a cross section in FIG. 1 substantially comprises an inner ring 4, an outer ring 6 and clamping rollers 8 which are arranged between the inner ring and outer ring and are distributed over the circumference of the inner ring 4 and which are, for example, guided in a cage 10. As can be seen from FIG. 1, the clamping rollers 8 are assigned in each case one clamping ramp 12, with the clamping ramps 12 being designed such that the annular gap between the inner ring 4 and the outer ring 6 tapers in each case in the direction of the arrow 14. The clamping rollers 8 are preloaded slightly by associated freewheel springs 16 in the clamping direction, that is to say in the direction of the arrow 14, such that said clamping rollers 8 bear constantly against the clamping ramp 12 and against the inner circumference 18 of the outer ring 6.

When the inner ring 4, which serves, for example, as the driving ring, is rotated relative to the outer ring 6 in a drive direction counter to the direction of the arrow 14, then the clamping rollers 8 become wedged between the inner ring 4 and the outer ring 6 and drive the latter (6) by means of frictional engagement (driving operation). When the inner ring 4 is rotated in the direction of the arrow 14 (or if the outer ring 6 overtakes the inner ring 4), then the wedging action of the clamping rollers 8 is eliminated (freewheel operation), such that a relative rotation can take place between the inner ring 4 and outer ring 6.

As has already been explained further above, in freewheel operation, there is the risk of the outer ring 6 grinding against the clamping rollers 8 if the freewheel springs 16 are too strong. In contrast, if the springs are too soft, then the clamping rollers 8 are driven by the outer ring 6, as a result of which the wear is relocated to the clamping ramps 12 and/or to the freewheel springs 16. Furthermore, driving of the clamping rollers can result in individual rollers changing their position on the clamping ramps 12 slightly. During a switch to driving operation, there is then the risk that said rollers become overloaded, with the result of the clamping ramps 12 being plastically deformed or even of the clamping rollers 8 overrunning the clamping ramps 12.

Figure 2:
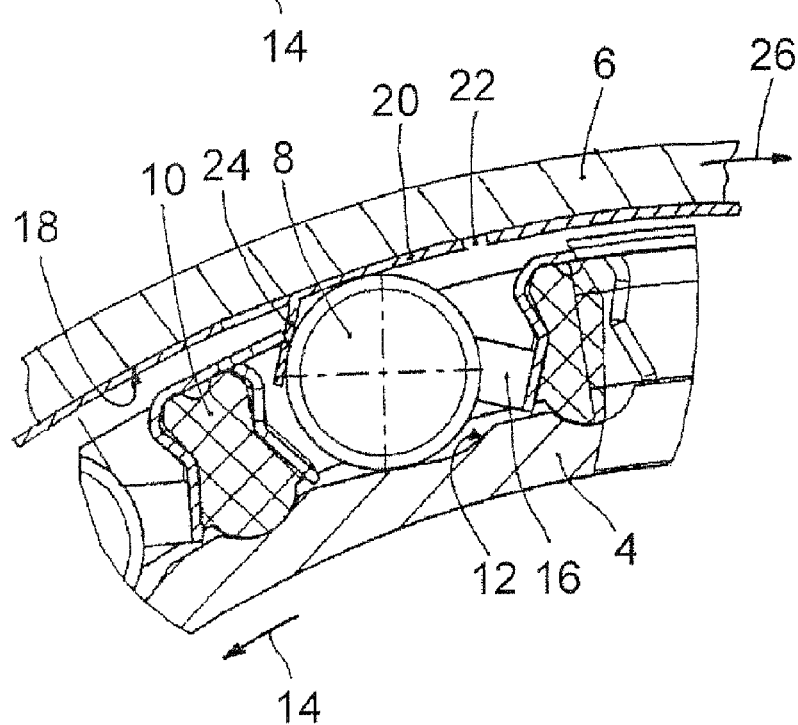
FIG. 2 shows an illustration approximately corresponding to FIG. 1, but with a protective ring according to the invention.

FIG. 2 shows a clamping roller freewheel which corresponds substantially to the arrangement of FIG. 1, but incorporates the improvement according to the invention. Here, identical parts are denoted by the same reference symbols.

A protective ring 20 which surrounds the clamping rollers 8 is arranged between the clamping rollers 8 and the inner circumference 18 of the outer ring 6. The protective ring 20 is slotted (slot 22) so as to be variable in diameter. As can be seen in particular from FIG. 3, retaining lugs 24 are cut out at the side edges of the protective ring 20 and are bent radially inward, which retaining lugs bear against the clamping rollers 8 in such a way, that the protective ring 20 is prevented from being driven by the outer ring 6 in idle running operation.

The clamping roller freewheel according to the invention functions as follows: In driving operation, the clamping rollers 8 are wedged, in the manner described on the basis of FIG. 1, between the clamping ramps 12 and the protective ring 20, and press the latter in a frictionally engaging manner against the inner circumference 18 of the outer ring 6, such that said outer ring 6 is driven. In idle running operation, the wedging action of the clamping rollers 8 is eliminated, such that the outer ring 6 can rotate relative to the inner ring 4 in the direction of the arrow 26. The protective ring 20 is prevented from rotating by the retaining lugs 24, that is to say a sliding movement takes place between the protective ring 20 and the outer ring 6. In this way, it is ensured independently of the design of the freewheel springs 16 that the outer ring 6 cannot grind against or rotate the clamping rollers 8, such that wear to the clamping rollers 8, to the clamping ramps 12 and/or to the freewheel springs 16 is reduced or prevented. Furthermore, it is ensured that individual clamping rollers 8 do not change their position on the clamping ramps 12 and are therefore not overloaded during the switch into driving operation.

FIG. 3 shows a segment of a clamping roller freewheel without the outer ring in a perspective view. It is possible to see the inner ring 4, the clamping rollers 8 and the protective ring 20, which surrounds said clamping rollers 8, having the slot 22 which permits a change in diameter and having the retaining lugs 24 which prevent the protective ring 20 from being driven by the outer ring.

As can also be seen from FIG. 3, the clamping roller freewheel is assigned a coaxial rolling bearing 28, which is embodied as a roller bearing and by means of which the clamping roller freewheel is precisely centered. The retaining lugs bear at the inside against cage rims 30, 32 of the inner ring 4, such that the protective ring 20 is fixed axially.

LIST OF REFERENCE SYMBOLS

- 2 Clamping roller freewheel
- 4 Inner ring
- 6 Outer ring
- 8 Clamping rollers
- 10 Cage
- 12 Clamping ramp
- 14 Springs
- 16 Freewheel springs
- 18 Inner circumference
- 20 Protective ring
- 22 Slot
- 24 Retaining lugs
- 26 Arrow
- 28 Rolling bearing
- 30 Cage rim
- 32 Cage rim

The invention claimed is:

1. A clamping roller freewheel, comprising:
an inner ring;
an outer ring; and
clamping rollers arranged between the inner ring and the outer ring, the clamping rollers interacting with one clamping ramp formed on an outer circumference of the inner ring,
wherein the clamping rollers are surrounded by an elastically expandable protective ring, which is concentric with respect to a freewheel axis, and
wherein the protective ring is a slotted ring having means which prevent the protective ring from being driven in rotation by the outer ring in idle running operation, wherein the means are retaining lugs formed on the protective ring, which retain and bear against the clamping rollers.

2. The clamping roller freewheel of claim 1, wherein the protective ring is composed of an elastic material strip.

3. The clamping roller freewheel of claim 2, wherein the protective ring has a width which corresponds substantially to an axial length of the clamping rollers.

4. The clamping roller freewheel of claim 1, wherein the retaining lugs, which are cut out of a material strip surface, are bent radially inward at least at one side edge of the protective ring.

5. The clamping roller freewheel of claim 4, wherein the retaining lugs assigned to each of the clamping rollers are formed, in each case, at both side edges of the protective ring.

6. The clamping roller freewheel of claim 4, further comprising: a cage for guiding the clamping rollers, wherein the retaining lugs are guided axially on cage rims.

7. The clamping roller freewheel of claim 1, wherein the protective ring is formed from a spring steel material.

8. The clamping roller freewheel of claim 1, wherein the inner ring simultaneously has a raceway for a rolling bearing which is coaxial with respect to the clamping roller freewheel.

* * * * *